(No Model.) 2 Sheets—Sheet 1.
J. DEMAREST.
WATER CLOSET CISTERN.
No. 379,376. Patented Mar. 13, 1888.
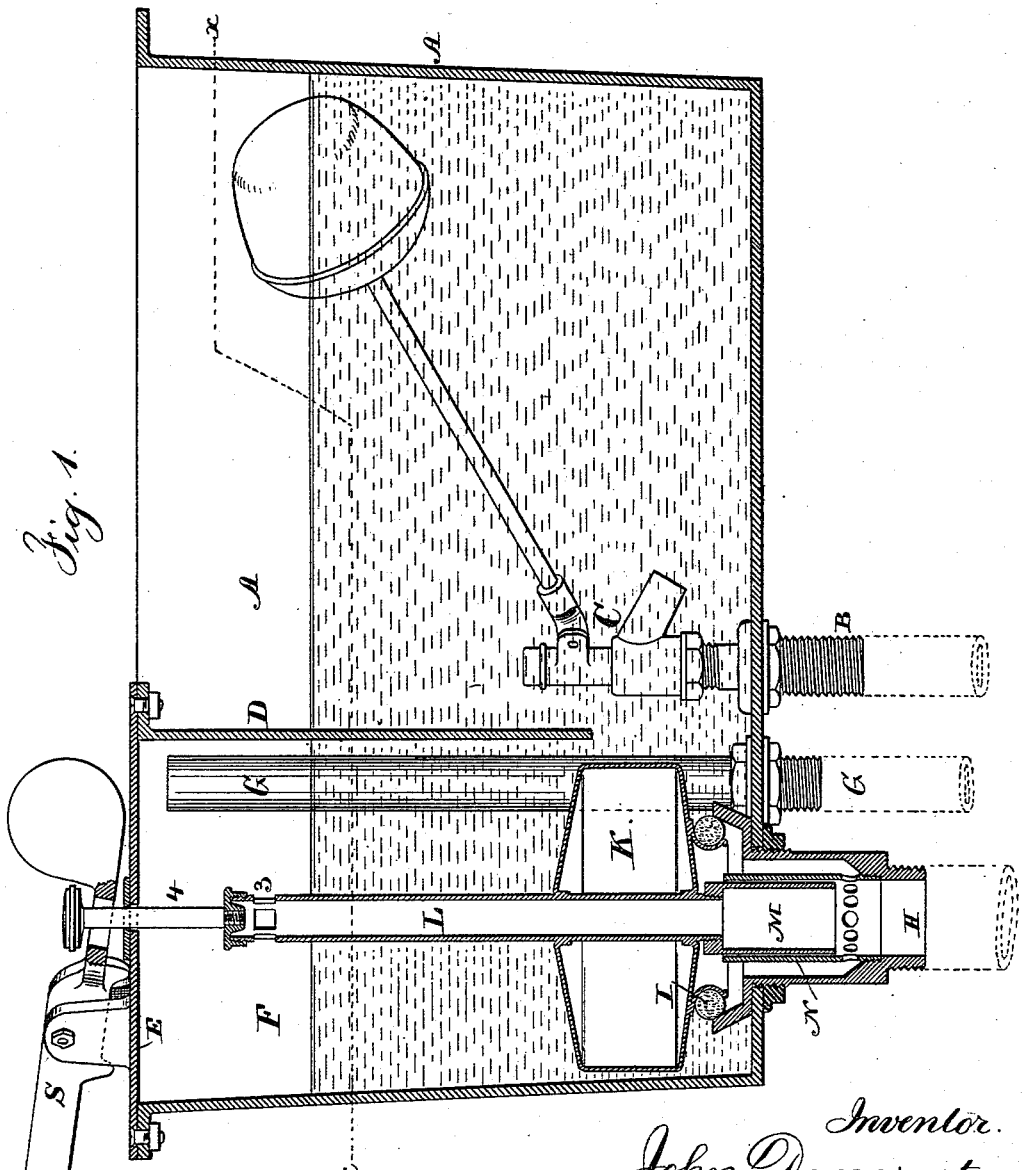

(No Model.) 2 Sheets—Sheet 2.
J. DEMAREST.
WATER CLOSET CISTERN.
No. 379,376. Patented Mar. 13, 1888.
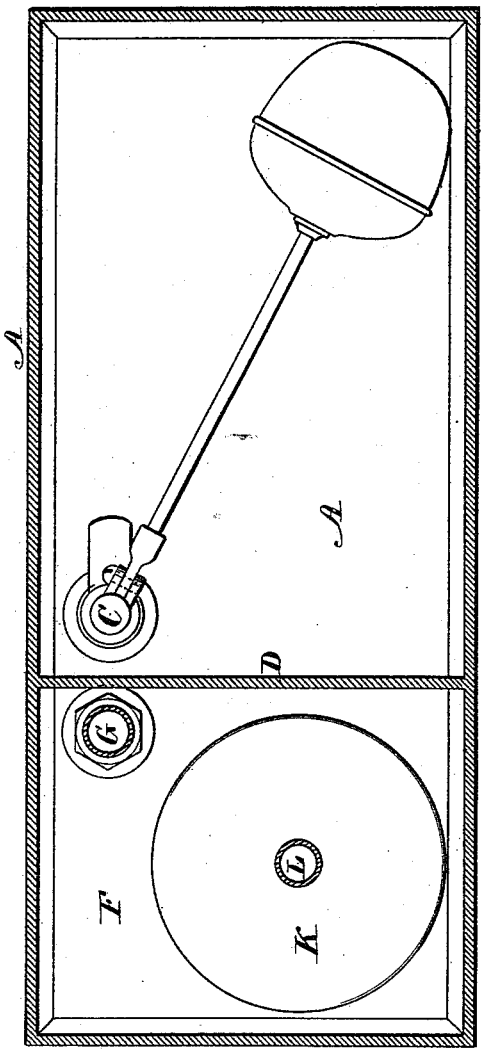

UNITED STATES PATENT OFFICE.

JOHN DEMAREST, OF NEW YORK, N. Y., ASSIGNOR TO THE J. L. MOTT IRON WORKS, OF SAME PLACE.

WATER-CLOSET CISTERN.

SPECIFICATION forming part of Letters Patent No. 379,376, dated March 13, 1888.

Application filed October 9, 1886. Serial No. 215,781. (No model.)

*To all whom it may concern:*

Be it known that I, JOHN DEMAREST, of the city and State of New York, have invented an Improvement in Water-Closet Cisterns, of which the following is a specification.

This cistern is to be employed with that class of water-closets in which there is a trap in the lower part of the basin and a second trap below the basin, and the air is exhausted from the discharge-pipe between the two traps, so that the contents of the closet are discharged by a siphon action.

My present invention is for simplifying the cistern and rendering the same inexpensive to construct and reliable in its action.

I employ an ordinary float and cock to supply water into an open cistern. One end of this cistern is partitioned off by a hanging partition and a cover is applied to inclose a chamber, and within this chamber is a pipe open at the upper end and leading to the exhaust-chamber of the discharge-pipe, and in the chamber of the cistern is a combined valve-exhauster and float at the upper end of the flushing-pipe.

The cistern is filled in the ordinary manner and the water rises in the chamber to the same level as the water in the cistern, and when the combined float and valve are lifted the exhauster and the descent of water cause a suction in the chamber that produces a siphon action in the discharge-pipe of the closet. The float holds up the valve until the water has descended below the partition and the vacuum has been broken, and the further descent of the valve takes place while the closet is being supplied with the water that remains in the bottom thereof.

In the drawings, Figure 1 is a vertical section of the cistern, and Fig. 2 is a sectional plan at the line $xx$.

The cistern A is of a size adapted to receive the proper quantity of water for washing the closet. B is the supply-pipe, and C the float valve or cock by which water is admitted.

In the cistern A there is a partition, D, the bottom of which is at the proper distance from the bottom of the cistern, and there is a removable cover, E, inclosing the exhausting-chamber F. The pipe G leads to the exhaust-chamber in the discharge-pipe between the two traps of the closet, and this pipe G is open at the upper end within the chamber F, and near the top thereof, and there is a flushing-pipe, H, with a valve, I, at its upper end, and a float, K, upon the top of the said valve, and the tubular overflow-pipe L, above this float K, has lateral openings 3, and a rod, 4, passing through a hole in the cover E to the pull-lever S.

Ordinarily the water will rise in the cistern A nearly to the openings 3 in the pipe L; or should the ball-cock fail to properly close the supply the surplus water runs away through the openings 3. The float K is adapted to support the valve I after the parts have been lifted by the pull-lever S; but the valve I is sufficiently large for the pressure of the water to hold down the valve against the action of the float when in its seat.

It will now be understood that when the valve I, float K, and pipe L are lifted by the action of the pull-lever S the water rushes rapidly down the flushing-pipe H, and in so doing the air from the chamber F is drawn down through the pipe L, and the descent of the water in the chamber F also produces a minus atmospheric pressure in the chamber F, causing an exhaust of the siphon-chamber in the closet through the pipe G. The closet is now washed out by the siphon action and the water through the flushing-pipe H, and as soon as the water-level in the cistern A descends below the bottom of the partition K the minus pressure in the chamber F is relieved by the admission of air and the siphon of the closet ceases to act, but the float K still holds up the valve I, so that the necessary amount of water continues to run into the closet, after which the valve I closes upon its seat and the cistern refills with water.

I make use of a tubular guide, N, within the valve-seat at the upper end of the flushing-pipe, with lateral openings through the lower part of this tubular guide, and upon the under side of the float and within the valve is the tube M, projecting downwardly within the guide-tube and forming a prolongation of the overflow-pipe, so that the water as it rushes down through the flushing-pipe acts directly as an exhauster of the air in the chamber.

I do not claim a float with a valve upon its under surface sufficiently large for the pressure of water to hold the float down when the valve is upon its seat and which float sustains the valve when lifted. By my improvement the tubular valve-stem becomes an overflow, and also a part of the exhauster that causes the water as it rushes down the flushing-pipe to draw the air out of the chamber F.

The subject-matter herein shown, consisting in the combination, with the flushing-pipe and an exhausting-pipe leading to the closet, of a supply-cistern and a minus-pressure chamber into which the exhausting-pipe opens, a valve at the upper end of the flushing-pipe, and a float to hold up such valve until after the water has descended to admit air into the minus-pressure chamber, is not claimed in this application, as the same forms the subject and is claimed in my application, Serial No. 202,352, filed May 17, 1886.

I claim as my invention—

1. The combination, with a cistern into which water is admitted by a cock and float, of a minus-pressure chamber closed at the top and open at the bottom, a suction-pipe leading from the closet to the upper part of the chamber, a flushing-pipe opening through the bottom of the cistern and below the minus-pressure chamber, a valve at the upper end of the flushing-pipe, a valve-stem and lever for lifting the valve, and a float for sustaining the valve when lifted until air has been admitted into the minus-pressure chamber by the descent of the water in the cistern, substantially as set forth.

2. The combination, in a cistern for water-closets, of a flushing-pipe, a valve at the upper end of such flushing-pipe, a tubular stem to the valve open at the upper end and forming an overflow, a lever for lifting the valve and stem, an inclosure around and above the tubular valve-stem forming a minus-pressure chamber, and a pipe leading from the upper part of such chamber to the water closet, substantially as and for the purposes set forth.

3. The combination, with a water-closet cistern having a supply water pipe and cock, of an inclosure forming a minus-pressure chamber that is open at the bottom, an exhausting-pipe leading from the upper part of the minus-pressure chamber to the closet, a flushing-pipe from the bottom of the cistern below the minus-pressure chamber and leading to the closet, a valve at the upper end of the flushing-pipe, a tubular stem to such valve and open at the upper end to form an overflow, a lever and rod passing through the top of the minus-pressure chamber and connected with the tubular valve-stem, and a float around the tubular valve-stem for sustaining the valve after it has been raised until air is admitted into the minus-pressure chamber, substantially as set forth.

4. The combination, with the minus-pressure chamber in a water-closet cistern, of an exhausting-pipe leading to the closet from the upper part of the minus-pressure chamber, a flushing-pipe leading to the closet and opening through the bottom of the cistern beneath the minus-pressure chamber, a valve to the flushing-pipe, a tubular stem passing through the valve and open at both ends, whereby the water flowing through the flushing-pipe causes a suction through the tubular valve stem to withdraw air from the minus-pressure chamber, substantially as set forth.

5. The combination, with a water-closet cistern having a supply pipe and cock, of an inclosure forming a minus-pressure chamber, with an opening between the minus-pressure chamber and the bottom of the cistern, a flushing-pipe through the bottom of the cistern below the minus-pressure chamber, a valve for such flushing-pipe, a tubular stem passing through the valve and open at both ends, the upper end being above the water-line, a float around the tubular valve-stem, a lever and a rod passing through the top of the minus-pressure chamber and connected to the tubular stem, and an exhausting-pipe leading from the minus-pressure chamber to the closet, whereby the valve is floated after being lifted, and the rush of water through the flushing-pipe draws air from the minus-pressure chamber, substantially as set forth.

6. The combination, with the flushing-pipe, of a valve-seat at the upper end, a stationary tubular guide, N, within the valve-seat, a valve to rest upon the seat, a float connected with the valve, a tube passing vertically through the float and having the tube M at its lower end and within the tubular guide N, to form an exhauster, and the chamber F, containing the float-valve and overflow-pipe, substantially as specified.

Signed by me this 28th day of September, A. D. 1886.

JOHN DEMAREST.

Witnesses:
MAX GOEBEL,
HENRY MORFORD.